US008834710B2

(12) United States Patent
Domokos et al.

(10) Patent No.: US 8,834,710 B2
(45) Date of Patent: Sep. 16, 2014

(54) METHOD FOR THE START-UP OF A CATALYTIC PROCESS

(75) Inventors: László Domokos, Amsterdam (NL); Hermanus Jongkind, Amsterdam (NL); Pieter Van Der Laan, Amsterdam (NL); Marcello Stefano Rigutto, Amsterdam (NL)

(73) Assignee: Shell Oil Company, Houston, TX (US)

( * ) Notice: Subject to any disclaimer, the term of this patent is extended or adjusted under 35 U.S.C. 154(b) by 969 days.

(21) Appl. No.: 12/743,477

(22) PCT Filed: Nov. 19, 2008

(86) PCT No.: PCT/EP2008/065877
§ 371 (c)(1),
(2), (4) Date: Jul. 29, 2010

(87) PCT Pub. No.: WO2009/065878
PCT Pub. Date: May 28, 2009

(65) Prior Publication Data
US 2011/0000822 A1    Jan. 6, 2011

(30) Foreign Application Priority Data

Nov. 19, 2007  (EP) .................................... 07120959

(51) Int. Cl.
*B01J 37/20*     (2006.01)
*C10G 49/24*     (2006.01)
*C10G 45/08*     (2006.01)
*B01J 37/00*     (2006.01)
*B01J 23/883*    (2006.01)

(52) U.S. Cl.
CPC .............. *C10G 49/24* (2013.01); *B01J 37/0045* (2013.01); *B01J 37/20* (2013.01); *B01J 23/883* (2013.01); *C10G 45/08* (2013.01); *Y10S 585/906* (2013.01); *Y10S 585/951* (2013.01)
USPC ........... 208/145; 208/289; 208/295; 585/276; 585/906; 585/951; 502/315; 502/321

(58) Field of Classification Search
CPC .......... B01J 37/20; C10G 49/24; C10G 45/08
USPC .......... 208/142–145, 289, 295; 585/275–277, 585/906, 951; 502/217–223, 300–355
See application file for complete search history.

(56) References Cited

U.S. PATENT DOCUMENTS 3,016,347 A    1/1962   O'Hara
3,016,647 A    1/1962   Peterson et al.
(Continued)

FOREIGN PATENT DOCUMENTS

CN    1753731      2/2004
EP    0028938      5/1981
(Continued)

OTHER PUBLICATIONS

Ho, et al.:Promotion Effects in Bulk Metal Sulfide Catalysts, Applied Catalysis A: General 114 (1994), pp. 127-139.

(Continued)

*Primary Examiner* — Nina Bhat
*Assistant Examiner* — Jonathan Miller
(74) *Attorney, Agent, or Firm* — Charles W. Stewart

(57) ABSTRACT

A process for starting up a hydrotreating process using a bulk metal catalyst. The process comprises the steps of providing a hydrocarbon feed stream containing less than 100 ppmw nitrogen containing species; and adding a nitrogen-containing compound to the hydrocarbon feed stream followed by contacting the resulting feed stream with the bulk metal catalyst in the presence of hydrogen and a sulfur-containing species.

16 Claims, 1 Drawing Sheet

(56) References Cited

U.S. PATENT DOCUMENTS

| | | | |
|---|---|---|---|
| 3,287,258 A * | 11/1966 | Mason | 208/143 |
| 3,291,722 A * | 12/1966 | Taylor et al. | 208/110 |
| 3,308,054 A | 3/1967 | Duir et al. | 208/89 |
| 3,536,605 A | 10/1970 | Kittrell | |
| 3,654,138 A * | 4/1972 | Mosby et al. | 208/111.3 |
| 3,825,502 A | 7/1974 | Takenaka et al. | |
| 3,875,081 A | 4/1975 | Young | |
| 4,404,097 A | 9/1983 | Angevine et al. | |
| 4,408,067 A | 10/1983 | Nakamura et al. | |
| 4,418,007 A | 11/1983 | Derrien | |
| 4,425,260 A | 1/1984 | Ebner | |
| 4,491,639 A | 1/1985 | Happel et al. | |
| 4,857,171 A | 8/1989 | Hoek et al. | |
| 5,006,224 A * | 4/1991 | Smegal et al. | 208/254 H |
| 5,244,858 A | 9/1993 | Usui et al. | |
| 5,654,252 A * | 8/1997 | Dufresne et al. | 502/220 |
| 5,658,546 A | 8/1997 | Kobayashi et al. | |
| 6,037,300 A | 3/2000 | Kasztelan et al. | |
| 6,090,745 A | 7/2000 | DuBois et al. | |
| 6,124,232 A | 9/2000 | Chang et al. | |
| 6,162,350 A | 12/2000 | Soled et al. | |
| 6,271,169 B1 | 8/2001 | Kourtakis et al. | |
| 6,638,890 B2 | 10/2003 | Tanimoto et al. | |
| 6,780,816 B2 | 8/2004 | Tanimoto et al. | |
| 7,071,140 B2 | 7/2006 | Paparizos et al. | |
| 7,666,297 B2 * | 2/2010 | Lee et al. | 208/208 R |
| 2003/0065216 A1 | 4/2003 | Tanimoto et al. | |
| 2004/0102643 A1 | 5/2004 | Tway | |
| 2004/0182749 A1 | 9/2004 | Domokos et al. | |

FOREIGN PATENT DOCUMENTS

| | | | |
|---|---|---|---|
| EP | 1090682 | 4/2001 | |
| EP | 1090683 | 4/2001 | |
| EP | 1150769 | 6/2007 | |
| FR | 2668951 A1 * | 5/1992 | B01J 37/20 |
| GB | 2114594 | 8/1983 | |
| RU | 2242283 | 12/2004 | |
| WO | 0004216 | 1/2000 | |
| WO | WO0041810 | 7/2000 | B01J 37/02 |
| WO | WO0042119 | 7/2000 | C10C 1/18 |
| WO | 2004041811 | 5/2004 | |
| WO | 200473659 | 9/2004 | |
| WO | WO2004073854 | 9/2004 | B01J 21/06 |
| WO | WO2004073859 | 9/2004 | B01J 37/03 |
| WO | WO2006027359 | 3/2006 | C10G 47/16 |

OTHER PUBLICATIONS

Girgis, et al: Reactivities, Reaction Networks and Kinetics in High-Pressure Catalytic Hydroprocessing, Ind. Eng. Chem. Res. (1991 American Chemical Society), 30, pp. 2021-2058.

Ho: Inhibiting Effects in Hydrodesulfurization of 4,6-diethyldibenzothiophene, Journal of Catalysis 219 (2003), pp. 442-451.

Landau M.V. et al., "Hydrodesulfurization of Methyl-Substituted Dibenzothiophenes: Fundamental Study of Routes to Deep Desulfurization," Journal of Catalysis, vol. 159, (1996) pp. 236-245.

* cited by examiner

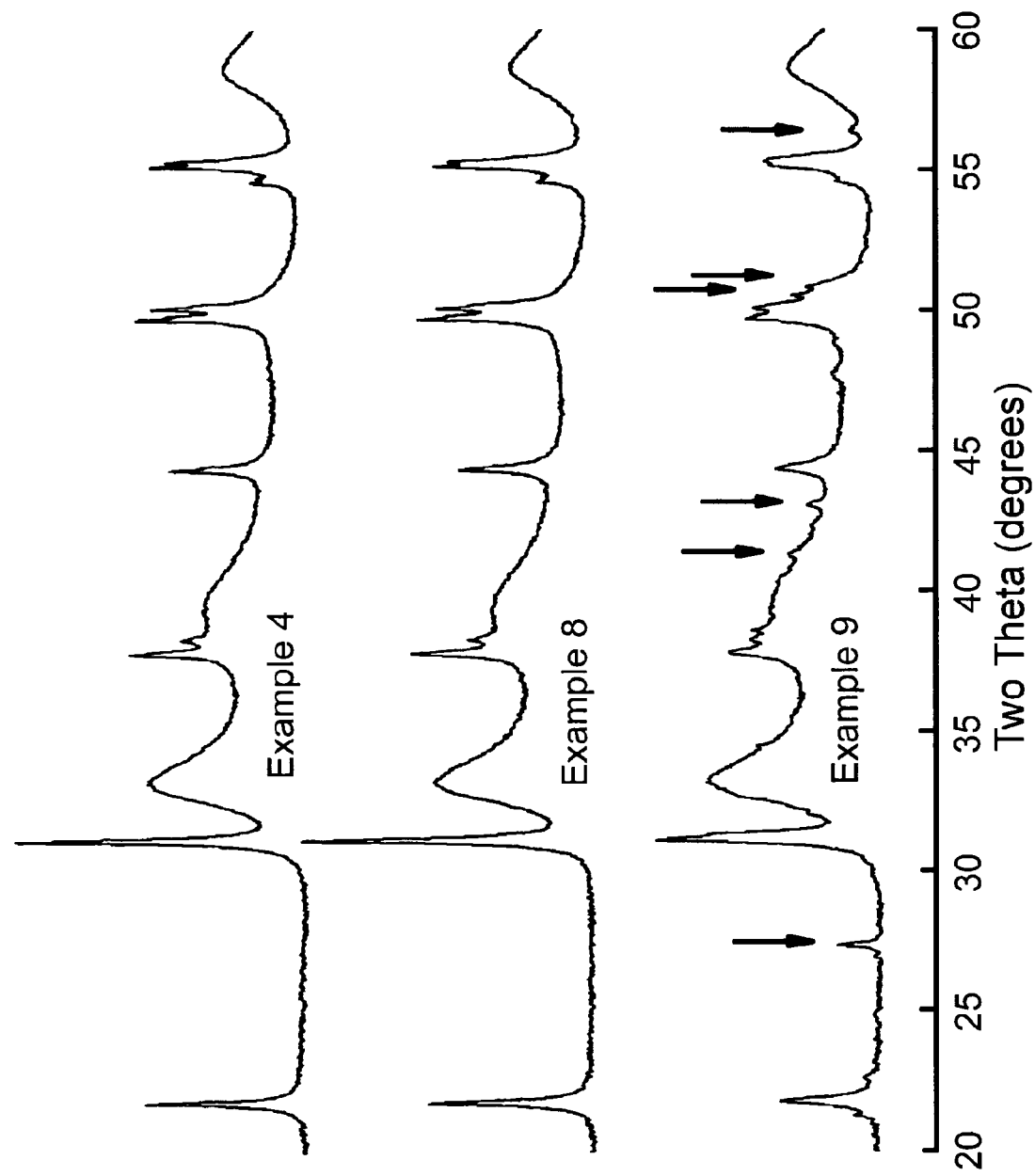

METHOD FOR THE START-UP OF A CATALYTIC PROCESS

The present application claims priority from European Patent Application 07120959.7 filed 19 Nov. 2007.

FIELD OF THE INVENTION

The present invention relates to a method for starting up a catalytic process.

BACKGROUND OF THE INVENTION

Hydroprocessing or hydrotreating reactions involve the application of hydrogen to a substrate, usually under elevated temperature and pressure, in the presence of a catalyst, with the aim of causing a physical or chemical change in the substrate. Most such hydroprocessing reactions occur in refinery operations where the substrate is a hydrocarbon feedstock.

Conventional hydroprocessing catalysts are generally in the form of a carrier of a refractory oxide material on which hydrogenation metals are deposited, the choice and amount of each component being determined by the end use. Refractory oxide materials usual in the art are amorphous or crystalline forms of alumina, silica and combinations thereof (though for some applications, materials such as titania may be used). These oxide materials can have some intrinsic catalytic activity but often only provide the support on which active metals compounds are held. The metals are generally base or noble metals from Group VIII and Group VIB of the Periodic Table which are deposited in oxidic form during manufacture; in the case of base metals, the oxides are then sulphided prior in order to use to enhance their activity.

Alternative catalyst forms have been proposed for use in the hydroprocessing of, for example, refinery streams. One such group of catalysts are termed 'bulk metal catalysts'. Such catalysts are formed mainly from metal compounds, usually by co-precipitation techniques, and have no need for a catalyst carrier or support; see for example WO 00/42119 and U.S. Pat. No. 6,162,350. Both publications disclose bulk metal catalysts comprising Group VIII and Group VIb metals. U.S. Pat. No. 6,162,350 discloses that such catalysts may contain one or more of each metal type, and examples show NiMo, NiW and the most preferred NiMoW bulk metal catalysts.

The preparation of such trimetallic bulk catalyst particles comprising at least one metal at least partly in solid state form, is also described in WO 00/41810.

Further bulk metal-type catalysts and processes for their production are described in WO 2004/073859. The catalysts, termed 'bulk metal oxide catalysts', disclosed in this document contain a refractory oxide material, which is not used as a catalyst support. For example, the compositions described in WO 2004/073859 have the form $(X)_b(M)_c(Z)_d(O)_e$, wherein X represents at least one non-noble Group VIII metal; M represents one non-noble Group VIb metal; Z represents one or more elements selected from aluminium, silicon, magnesium, titanium, zirconium, boron, and zinc; one of b and c is the integer 1; and d and e and the other of b and c each are a number greater than 0 such that the molar ratio of b:c is in the range of from 0.5:1 to 5:1, the molar ratio of d:c is in the range of from 0.2:1 to 50:1, and the molar ratio of e:c is in the range of from 1:1 to 50:1.

Further examples of related catalyst compositions include an unsupported catalyst composition which comprises one or more Group VIb metals, one or more Group VIII metals, and a refractory oxide material which comprises 50 wt % or more titania, on oxide basis as described in WO 2004/073854, and an unsupported bulk metal oxide catalyst composition which comprises one or more Group VIb metals, one or more non-noble Group VIII metals, one or more zeolites, and, optionally, a refractory oxide material as disclosed in WO 2006/027359.

Hereinafter, for ease of understanding, the term 'bulk metal catalyst' will be used to refer to any bulk metal or bulk metal oxide catalyst.

In order to be used as active catalysts, most hydrotreating catalysts, including bulk metal catalysts, must be converted to their sulfidic, or sulfide, form (i.e. sulfided). Such activation may be carried out as part of the start-up of reaction processes using these catalysts. Such a start-up can be carried out while contacting the catalyst with the full-range feed which is to be treated by the catalyst.

However, the use of a full-range feed during start-up is usually less than ideal. For example, if the hydrotreating catalyst is part of a catalyst bed containing more than one type of catalyst, starting up the process with the hydrotreating catalyst in contact with the full range feed may lead to other catalysts in the catalyst bed being poisoned by contaminants (e.g. sulfur, nitrogen and oxygen containing species) that have not been removed by the non- or partially-activated hydrotreating catalyst.

Furthermore, if the product hydrocarbon stream, having passed through the catalyst bed, is collected without separation or removal of the fraction which passed over the hydrotreating catalyst before it was sufficiently sulfided, then this can lead to undesirable contaminants being present in said product hydrocarbon stream.

Thus, it is advantageous to start-up the reaction process using the catalyst with a feed which contains fewer contaminants (e.g. sulfur, nitrogen and oxygen containing species) than a full-range feed.

It is known in the art that when using a feed containing fewer contaminants, an amount of sulfur-containing species may need to be added to the feed during start-up in order to ensure that enough sulfur is present to allow successful sulfidation of the catalyst It has been found by the present inventor that, even after the addition of sulfur-containing species, once bulk metal catalysts have been contacted with hydrocarbon feeds containing low levels of contaminants during start-up or sulfidation, a performance loss is observed. This observed loss of, e.g. hydrodesulfurization, activity cannot be restored by changing to a full range feed, or other heavier distillate streams, after the start-up is completed.

It would be advantageous to provide a start-up process, using hydrocarbon feeds containing low levels of contaminants, in which such a loss of performance does not take place.

SUMMARY OF THE INVENTION

The present invention relates to a process for starting up a hydrotreating process using a bulk metal catalyst, said process comprising the steps of:

i) providing a hydrocarbon feed stream containing less than 100 ppmw nitrogen-containing species;

ii) adding a nitrogen-containing compound to said hydrocarbon feed stream; and iii) contacting the resultant feed stream with the bulk metal catalyst in the presence of hydrogen and a sulfur-containing species.

The present invention further relates to a process for hydrotreating a hydrocarbon feedstock, said process comprising the steps of:

i) providing a hydrocarbon feed stream containing less than 100 ppmw nitrogen-containing species;

ii) adding a nitrogen-containing compound to said hydrocarbon feed stream;

iii) contacting the resultant feed stream with a bulk metal catalyst in the presence of hydrogen and a sulfur-containing species; and iv) subsequently, contacting the resultant bulk metal catalyst with the hydrocarbon feedstock in the presence of hydrogen.

BRIEF DESCRIPTION OF THE DRAWINGS

FIG. 1 shows X-ray diffraction patterns of the spent catalysts used in Examples 4, 8 and 9.

DETAILED DESCRIPTION OF THE INVENTION

During start-up, or sulfidation, of a hydrotreating process using a bulk metal catalyst, a significant loss in performance can occur when said start-up takes place using a hydrocarbon feed stream containing low levels of contaminants, even when sulfur-containing species have been added to said feed stream. It has surprisingly been found that such a loss in performance, in comparison to a process in which the bulk metal catalyst is started up in contact with full range gas oil, can be avoided by the addition of a nitrogen containing compound to the feed stream.

The terms 'hydroprocessing' and 'hydrotreating' are used herein to cover a range of hydrotreatment processes where the hydrocarbon feed is brought in contact with hydrogen in order to modify key physical and chemical properties. This includes hydrodesulfurisation (HDS) and hydrodenitrogenation (HDN). In the art of refinery processing a number of terms may be used to refer to processes which require HDS and HDN activity in some form. These terms include hydrotreating, hydrofinishing, hydrofining and hydrorefining. The process of the present invention therefore finds use in all these hydroprocessing reactions. Other hydrogenation processes, such as removal of oxygen containing compounds and hydrogenation of aromatics (also known in the art as hydrodearomatisation) are also suitable hydrotreating processes according to the present invention.

Hydrocarbon feedstocks that are subjected to hydrotreating processes include any crude or petroleum oil or fraction thereof. The feedstocks may be previously untreated or have already undergone such treatment as fractionation, for example atmospheric or vacuum distillation, cracking for example catalytic cracking, thermal cracking, or hydrocracking, or any other hydroprocessing treatment. Examples of such hydrocarbon feedstocks include catalytically cracked light and heavy gas oils, hydrotreated gas oil, light flash distillate, light cycle oil, vacuum gas oil, light gas oil, straight run gas oil, coker gas oil, synthetic gas oil, and mixtures of any two or more thereof. Other possible feedstocks include deasphalted oils, waxes obtained from a Fischer-Tropsch synthesis process, long and short residues, and syncrudes, optionally originating from tar sand, shale oils, residue upgrading processes and biomass.

Such feedstock may have a nitrogen content of up to 10,000 ppmw (parts per million by weight), for example up to 2,000 ppmw, and a sulfur content of up to 6 wt %. Typically, nitrogen contents are in the range of from 5 to 5,000 ppmw, most suitably in the range of from 5 to 1500 or to 500, e.g. from 5 to 200, ppmw, and sulfur contents are in the range of from 0.01 to 5 wt %. The nitrogen and sulfur compounds are usually in the form of simple and complex organic nitrogen and sulfur compounds.

The hydrocarbon feed stream containing less than 100 ppmw nitrogen containing species (based on the overall weight of the feed stream) used for starting up the hydrotreating process according to the present invention is, in its broadest sense, any suitable hydrocarbon feed stream that when used in the start up of a hydrotreating process causes a reduction in the activity of a bulk metal catalyst in comparison to when said catalyst is started up with a full range feed. Such feed streams include feeds (e.g. full range feeds) which have been treated in a process, such as hydrodenitrogenation, which reduces the amount of nitrogen-containing species to the required level. Alternatively, the feed stream containing less that 100 ppmw nitrogen-containing species may be a natural or synthetic stream which contains such a level of nitrogen-containing species without having undergone any specific treatment to reduce nitrogen levels.

Suitable hydrocarbon feed streams include streams such as light gas oil and already hydrotreated gas oil, which contain less than 100 ppmw nitrogen-containing compounds.

As used herein 'full range feed' refers to a feed stream containing the light, medium and heavy gas oil streams from an atmospheric crude distiller. Such a feed stream may also contain the vacuum gas oil cut from a vacuum crude distiller.

The bulk metal catalysts used in the present invention are compositions containing a high amount of Group VIII and Group VIB metals and, optionally, a limited amount of inert refractory oxide, e.g. silica, alumina, magnesia, titania, zirconia, boria, or zinc oxide, or mixtures thereof.

By the term 'bulk metal' catalyst it is to be understood that the composition is not of the conventional form which has a preformed, shaped catalyst support which is then loaded with metals via impregnation or deposition, but is a composition in which the metals and, optionally, refractory oxide material are combined together when the composition is formed prior to any shaping step. Unlike supported catalysts, in this bulk metal catalyst composition, any refractory oxide material present is no longer a separate distinct material within the composition.

Herein reference is made to the Periodic Table of Elements which appears on the inside cover of the CRC Handbook of Chemistry and Physics ('The Rubber Handbook'), 66$^{th}$ edition and using the CAS version notation.

Suitable bulk metal catalyst compositions are of the general formula (I):

$$(X)_b(M)_c(Z)_d(Y)_e \qquad (I)$$

The metal X is preferably a Group VIII metal, and is suitably one or two non-noble metals selected from nickel, cobalt and iron. Preferably, M is selected from one or two Group VIb metals, and is more preferably one or two non-noble metals selected from chromium, molybdenum and tungsten. Even more preferably, M is selected from molybdenum, tungsten and a combination of the two. The most preferred metal represented by M is dependent on the temperature intended for the end use of the catalyst. In applications where the end use is in a reactor temperature of below 380° C., it is preferably molybdenum, and where the end use temperature is 380° C. or above, it is preferably tungsten or a mixture of molybdenum and tungsten.

The element Y may be one or more elements selected from O or S. If present, the element represented by Z together with the oxygen component as element for Y forms a refractory inorganic oxide. The element Z may be one or more elements selected from aluminium, silicon, magnesium, titanium, zirconium, boron, and zinc. Preferably, Z represents one or more elements selected from aluminium, silicon, titanium and zinc. Most preferably Z represents silicon as the predominant, especially the sole, element. In another embodiment most preferably Z represents titanium as the predominant, especially the sole, element. In that case as optional additional elements Z, aluminium and silica are the most preferred. Additional small amounts (in the range of from 1 to 3 wt %) of zinc oxide in the refractory material of an oxide of the element 2 can be advantageous to increase surface area of the catalyst compositions.

The numbers b, c, d and e represent relative molar ratio values which are estimated taking one component as a standard or reference. Herein one of b and c is to be taken as the reference and designated as the integer 1. The other values are then established as relative values, based on the metals X and M as oxides.

Preferably c is the integer 1, and the ratio b:c is in the range of from 0.75:1 to 3:1, most preferably 0.8:1 to 2.5:1, especially 1:1; the ratio d:c is in the range 0:1 to 20:1, more preferably 0.5:1 to 20:1, most preferably 0.75:1 to 10:1, especially 0.8:1 to 5:1; and the ratio e:c is in the range of from 1:1 to 50:1, most preferably 4:1 to 20:1, especially 5:1 to 10:1.

Depending on the method of preparation that is followed to prepare the catalyst composition for use in the process of the present invention, there could be residual ammonia, organic species and/or water species present; following different methods, different amounts as well as different types of species can be present. In respect of water, also atmospheric conditions can affect the amount present in the catalyst composition.

Therefore to ensure that the catalyst composition definition is not distorted by atmospheric or preparation conditions, the definition used herein, on both an elemental basis and on percentage amount basis, is given on an oxide basis.

Preferably the amount of metal(s) X lies in the range of from 15 to 35 wt %, calculated as if the metal(s) are in their oxidic form and based on total catalyst weight, but more preferably is in the range of from 20 to 35 wt %, and especially from 25 to 33 wt %. The metal M is suitably present in the highest amount of the two metal types; preferably the metal M is present in an amount in the range of from 40 to 75 wt % calculated as if the metal is in the oxidic form and based on total catalyst weight, more preferably 45 to 60 wt %, and especially 50 to 55 wt %. If the balance of the catalyst, on an oxide basis, is comprised of a refractory oxide material, said refractory oxide material will suitably be present in an amount in the range of from 5, preferably from 10, more preferably from 15, to 40 wt %, preferably to 30, more preferably to 25, especially to 20. Preferred compositions contain from 10 to 30 wt %, more preferably from 15 to 25 wt %, and especially substantially 20 wt %.

In a catalyst composition for use in the invention, there may be in the range of from 0 to 10 wt %, basis total catalyst, of residual species, eg organics, ammonia and/or water species, and most commonly from 5 to 8 wt %. The presence and amount of such components can be determined by standard analysis techniques.

The bulk metal catalysts for use in the process of the present invention may be prepared by any suitable method known in the art. Such processes include those described in WO 00/42119, U.S. Pat. No. 6,162,350, WO 00/41810, WO 2004/073859, WO 2004/073854 and WO 2006/027359.

Preferably, the nitrogen-containing compound used in the method of the present invention is selected from the group consisting of amines (including polyfunctional amines), pyridines and their derivatives, quaternary ammonium compounds, other N heteroaromatics (such as pyrroles, indoles, carbazoles, imidazoles, pyrazoles, oxazoles, and S,N heteroaromatics), amides, nitriles and N containing complexing agents (such as EDTA, NTA, EGTA and DPTA). More preferably, the nitrogen-containing compound is selected from amines (including polyfunctional amines), pyridines and their derivatives and quaternary ammonium compounds. Even more preferably the nitrogen-containing compound is an amine. Most preferably the nitrogen-containing compound is a C4 to C20 amine.

The nitrogen-containing compound is added to the hydrocarbon feed stream containing less than 100 ppmw nitrogen-containing species in an amount such that the resultant hydrocarbon feed stream contains more than 100 ppmw, preferably at least 150 ppmw, more preferably at least 200 ppmw, even more preferably at least 500 ppmw, most preferably at least 1000 ppmw nitrogen-containing species (based on the overall weight of the feed stream).

'No significant loss in performance' as referred to herein, refers to the bulk metal catalyst, after start-up having no more than 10% lower hydro-desulfurisation activity than the same catalyst has, having been subjected to a start-up process in contact with a full range feed. Preferably, the reduction in activity is less than 8%, more preferably less than 5%, even more preferably less than 2%. It will be readily understood by the skilled person that a 0% loss in activity, i.e. an identical activity, or even an increase in activity is acceptable for the method of the present invention.

The process of the present invention may be carried out with the bulk metal catalyst compositions applied in any reactor type, preferably in a fixed bed reactor. If necessary, two or more reactors containing the catalyst may be used in series.

The bulk metal catalyst compositions may be applied in single bed and stacked bed configurations, where the compositions are loaded together with layers of other treatment catalyst into one or a series of reactors in consecutive order. Such other catalyst may be for example a further hydroprocessing catalyst or a hydrocracking catalyst.

The process of the invention may be run with the hydrogen gas flow being either co-current or counter-current to the feedstock flow.

During the start-up of a reaction process, the catalyst is, in an optional first step, dried by heating at a temperature in the range of from 100 to 150° C. in air. The catalyst is then contacted with the hydrocarbon feed stream before the hydrogen partial pressure is raised to a pressure suitable for sulfiding the catalyst. Preferably the hydrogen partial pressure is raised to a pressure in the range of from 2 to 10 MPa (20 to 100 bar), more preferably in the range of from 3 to 8 MPa (30 to 80 bar), most preferably in the range of from 4 to 8 MPa (40 to 80 bar).

A temperature program is then applied to the catalyst in order to increase the temperature to the required reaction temperature. Such a temperature program may comprise one or more temperature increase phases and, during each phase, the temperature may be increased at a rate in the range of from 1 to 50° C./hour, preferably in the range of from 10 to 40° C./hour, most preferably in the range of from 15 to 30° C./hour. If more than one temperature increase phase is used, the phases may be separated by a period during which no further temperature increase is applied. Alternatively, the phases may be operated immediately after one another.

Once start-up is completed, the hydrotreating process of the invention is operated under the conditions of elevated temperature and pressure which are conventional for the relevant hydroprocessing reaction intended. Generally, suitable reaction temperatures lie in the range of from 200 to 500° C., preferably from 200 to 450° C., and especially from 300 to 400° C. Suitable total reactor pressures lie in the range of from 1.0 to 20 MPa.

Typical hydrogen partial pressures (at the reactor outlet) are in the range of from 1.0 to 20 MPa (10 to 200 bar), and preferably from 5.0 to 15.0 MPa (50 to 150 bar) at which pressure compositions of and for use in the present invention have been found to have a particularly improved activity compared with conventional catalysts.

The hydrogen gas flow rate in the reactor is most suitably in the range of from 10 to 2,000 Nl/kg liquid feed, for example 100 to 1000 Nl/kg, more suitably 150 to 500 Nl/kg.

A typical liquid hourly space velocity is in the range of from 0.05 to 10 kg feedstock per liter catalyst per hour (kg/l/h), suitably from 0.1 to 10, preferably to 5, more preferably from 0.5 to 5, kg/l/h.

During the process for starting up, additives other than the nitrogen-containing compound may be added to the hydrocarbon feed stream. Specifically, a sulfur-containing compound may be added in order to ensure the presence of a suitable amount of sulfur in contact with the bulk metal catalyst for sufficient sulfidation. Typically, a suitable amount of sulfur in contact with the bulk metal catalyst is at least 1 wt %, preferably at least 1.5 wt %, based on the overall weight of the feed. Suitably, the amount of sulfur in contact with the bulk metal catalyst is no more than 10 wt %, preferably no more than 8 wt %, based on the overall weight of the feed.

The present invention will now be illustrated by the following non-limiting examples.

Example 1

Catalyst

A bulk metal catalyst was prepared by contacting suitable nickel and molybdenum salts slurried in water at 80° C. with ammonia and Sipernat 50 (Sipernat is a trademark). After 30 minutes digestion time, the slurry was spray-dried. The obtained powder was rewetted with water, and mulled in a mix muller until a suitable mix for extrusion was obtained. The obtained mix was extruded into a trilobe form. The thus-obtained green extrudates were dried at 120° C. for 1 hour, and calcined at 300° C. for a further hour.

The elemental structure of the solid obtained in this Example was $(Ni)_{1.0}(Mo)_{1.0}(Si)_{0.9}(O)_{5.8}$ with a nominal catalyst composition of Ni—Mo—$SiO_2$ (27 wt %, 53 wt %, 20 wt % on oxide basis, referring to the weight % of NiO, $MoO_3$ and $SiO_2$ in the sample).

In all the Examples below, unless otherwise, stated, the straight run gas oil used was a mixture of Arabian heavy and Arabian light gas oils, from a refinery stream, with the features shown in Table 1:

TABLE 1

| Straight Run Gas Oil | | |
|---|---|---|
| Density at 20/4° C. | g/ml | 0.8567 |
| Carbon content | % w | 85.34 |
| Hydrogen content | % w | 13.02 |
| Sulfur content | % w | 1.62 |
| Total nitrogen content | ppmw | 152 |

Loading

In each Example, the catalyst prepared in Example 1 was dried at 200° C. for 15 minutes in order to remove loosely bound moieties. The catalyst was then diluted with SiC to ensure proper plug flow up to 99.95% conversion under hydrotreating conditions and placed into a pilot plant reactor.

Example 2

Comparative

Start-Up

After loading, the catalyst was wetted by contacting it with straight run gas oil at a sufficiently high volumetric space velocity, until breakthrough of the wetting feed was observed. Upon breakthrough, the volumetric space velocity was set to 1.5 $h^{-1}$ and $H_2$ and $H_2S$ gas were fed into the reactor. The hydrogen gas to feed ratio was set at 200 $Nl \cdot kg^{-1}$, while the pressure was increased to 40 bar hydrogen partial pressure. The $H_2S$ gas to feed ratio was set at 3 $Nl \cdot kg^{-1}$.

The following temperature program was applied to complete the conversion of the oxidic precursor to the catalytically active sulfided form: The temperature was increased from room temperature to 130° C. at a ramping rate of 20° C./hour. After 10 hours hold time, the temperature was further increased to 280° C. at the same ramping rate. After 10 hours additional hold time, the temperature was increased to the reaction temperature of 345° C. Once this temperature was reached, the flow of $H_2S$ was switched off, but the flow of hydrogen was maintained.

Activity Testing

The catalytic activity was measured using the straight run gas oil at 345° C., 55 bar hydrogen partial pressure and an LHSV of 1.5 $h^{-1}$. Product samples were taken once every 24 hours. On-line stripping was used to eliminate most of the dissolved $H_2S$. Off-line stripping completed the $H_2S$ elimination procedure before analysis was performed by XPS.

Example 3

Comparative

Start-Up

After loading of the catalyst, $H_2$ was fed into the reactor and the pressure was set to 40 bar hydrogen partial pressure. The straight run gas oil feed was not immediately introduced to the reactor. The temperature was raised to 135° C. After 2 hours hold time, the straight run gas oil was introduced at 135° C. and at sufficiently high volumetric space velocities to ensure proper wetting. Upon breakthrough, the volumetric space velocity was set to 1.5 $h^{-1}$. The hydrogen gas to feed ratio was set to 200 $Nl \cdot kg^{-1}$. The temperature was held at 135° C. After not longer than 5 hours time in total at 135° C., the temperature was further increased to 280° C. at a 30° C./hour ramping rate. After 10 hours hold time, the temperature was again increased to the reaction temperature of 345° C. $H_2S$ was not admitted to the reactor throughout the whole start-up process.

Activity Testing

The reaction conditions and feed used to evaluate the catalytic activity were identical to those used in Example 2.

Example 4

Comparative

Start-Up

After loading of the catalyst, a start-up process according to Example 3 was applied with the following differences. After loading, the pressure was set to 55 bar hydrogen partial pressure. As a compensation for the higher hydrogen partial pressure, an additional amount of sulfur, in the form of Sulfrzol (Sulfrzol is a trade mark), was added to the straight run gas oil before it was contacted with the catalyst. This addition resulted in a 1.5 wt % sulfur equivalent increase in the total sulfur content.

Activity Testing

The reaction conditions and feed used to evaluate the catalytic activity were identical to those used in Example 2.

Example 5

Comparative

Start-Up

After loading of the catalyst, a start-up process as described in Example 2 was applied, with the following differences. Instead of using straight run gas oil for the start-up process, straight run gas oil which had already been subjected to hydrotreating was used. This feed had the properties shown in Table 2.

TABLE 2

| Hydrotreated Gas Oil | | |
|---|---|---|
| Sulfur content | % w | <50 |
| Total nitrogen content | ppmw | <1 |

In order to compensate for the lower amount of sulfur present in the feedstock, an additional amount of sulfur was added, in the form of Sulfrzol (Sulfrzol is a trade mark), in order to increase the sulfur content to 1.5 wt %.

Activity Testing

After completing the start-up process, the feed was switched to straight run gas oil. The reaction conditions and feed used to evaluate the catalytic activity was identical to those used in Example 2.

Example 6

Comparative

Start-Up

After loading, a start-up process as described in Example 5 was applied, except that Sulfrzol (Sulfrzol is a trade mark), was added to the straight run gas oil which had already been subjected to hydrotreating, to compensate for the shortage of sulfur available for completion of the sulfidation during the procedure, in an amount resulting in 0.5 wt % added sulfur.

Activity Testing

The reaction conditions and feed used to evaluate the catalytic activity were identical to those used in Example 2.

Example 7

Comparative

Start-Up

After loading of the catalyst, a start-up process as described in Example 5 was applied, except that no H$_2$S gas flow was admitted to the catalyst during the start-up procedure.

Activity Testing

The reaction conditions used to evaluate the catalytic activity were identical to those used in Example 2.

Example 8

Start-Up

After loading of the catalyst, a start-up process as described in Example 4 was applied, with the following differences. Instead of using straight run gas oil for the start-up process, straight run gas oil which had already been subjected to hydrotreating was used. This feed had the properties shown in Table 2.

This feed was doped with enough Sulfrzol (Sulfrzol is a trade mark) to ensure 1.5 wt % additional sulfur being present in the feedstock (as in Example 4) and was also doped with decylamine to the level of 1800 ppmw.

Activity Testing

The reaction conditions used to evaluate the catalytic activity were identical to those used in Example 2.

Example 9

Comparative

Start-Up

After loading of the catalyst, a start-up process as described in Example 4 was applied, with the following differences. Instead of using straight run gas oil for the start-up process, a light gas oil of Middle Eastern origin was used. This feed had the properties shown in Table 3.

TABLE 3

| Light Gas Oil | | |
|---|---|---|
| Density at 20/4° C. | g/ml | 0.8391 |
| Carbon content | % w | 85.41 |
| Hydrogen content | % w | 13.42 |
| Sulfur content | % w | 1.21 |
| Total nitrogen content | ppmw | 72 |

Sulfrzol (Sulfrzol is a trade mark) was added to the feed to ensure an additional amount of 1.5 wt % sulfur being present throughout the start-up period.

Activity Testing

The reaction conditions and feed used to evaluate the catalytic activity were identical to those used in Example 2.

Example 10

Catalytic activity is typically expressed as the temperature required for 10 ppmw sulfur in product according to industrial standards, using pseudo-first order reaction kinetics for the description of sulfur removal, and for the correction of minor variations in process parameters.

Table 4 shows the difference of HDS catalytic performance expressed in relative volumetric activity calculated from the pseudo-first order reaction rate constant of the HDS reaction rate obtained relative to Example 2. Commonly applied reaction order and activation energy were used for the calculation of the pseudo-first order reaction rate constants in accordance with the open art. For methods see, for example, Ind. Eng. Chem. Res., 30, (1991) 2021-2058; J. Catal., 219 (2003) 442-451; and Appl. Catal., 114 (1994) 127-139.

TABLE 4

| Relative Volumetric Activity in HDS in ULSD Operation (Example 2 is taken as base case for the calculation) | |
|---|---|
| Example | Relative Volumetric Activity in HDS (%) |
| 2 | 100 |
| 3 | 108 |
| 4 | 112 |
| 5 | 58 |

TABLE 4-continued

Relative Volumetric Activity in HDS in ULSD
Operation (Example 2 is taken as base case for the calculation)

| Example | Relative Volumetric Activity in HDS (%) |
|---|---|
| 6 | 63 |
| 7 | 70 |
| 8 | 98 |
| 9 | 72 |

The pseudo-first order reaction rate constants were obtained at relatively short time on-stream, after a week stabilization time. The average value observed after day and 7 is shown in Table 4. All activity was measured in ULSD operation, meaning that none of the obtained sulfur slips were below 5 ppmw or above 60 ppmw at the target condition. This allowed full compliance with both ULSD operations and ideal plug flow conditions.

It is easy to conclude from Table 4 that start-up conditions and the straight run gas oil applied in Example 2, 3 and 4 are ideal for starting up a process using a high performance bulk metal catalyst specially suited for ULSD operation. Using the warm prewetting could slightly further increase the observed performance in HDS both at medium and higher partial pressures of hydrogen present during start-up.

However, as stated above, applying a straight run gas oil during the starting up of such a process is unsuitable due to contamination of the final product and potential poisoning of other catalysts in a reactor bed.

It is also directly evident from Table 4 that applying an already treated feedstock as a start-up feed is not recommended for starting up a high performance bulk metal catalyst, as the relative volumetric activity of gas oil HDS decreased with 30 to 40% compared to the same start-up applied with full range gas oil (see Examples 5 to 7).

Example 8 shows the surprising effect of the addition of decylamine to the otherwise non-favourable start-up feed. Instead of providing poor HDS performance, the activity in Example 8 is restored to nearly identical levels to the base case (Example 2). Thus high levels of activity are obtained while contamination of the desired product is avoided.

Example 9 reveals that using a light gas oil instead of a full range straight run gas oil during start-up will also be severely detrimental to the HDS performance of the catalyst in ULSD mode.

Example 11

Spent catalysts from Examples 4, 8 and 9 were recovered from the pilot plant using a special procedure that prevented oxygen contacting the sulfidic catalyst sample. At the end of the catalytic test the reactor was allowed to cool down from the testing temperature to 200° C. under the test feed flow and $H_2$ flow. Thereafter, the feed flow was stopped and the reactor was further cooled down under $H_2$ flow. When the reactor was cooled down sufficiently to allow handling, the reactor was taken out of the test unit and was taken to the workbench, where it was flushed with gasoline, and subsequently with nitrogen in order to allow sufficient drying.

The spent catalyst was removed from the reactor. The catalyst particles were separated from the SiC filling by sieving in air. The recovered catalyst extrudates were stored in glass bottles in air at ambient temperature, without exposure to light.

The X-ray powder diffractograms of the spent samples were recorded on an X'Pert Pro diffractometer. Cu—$K_\alpha$ radiation was used and was detected with an X'Celerator linear array detector without monochromator and a 20 μm Ni-filter in the diffracted beam. An automatic divergence slit ensured irradiation of a constant sample surface. The resulting increase with 2θ of the measured sample volume yielded an increasing background level due to fluorescence. This was corrected for by first converting the diffractograms to fixed slits, and subsequently subtracting a background with a granularity of 70 and a bending factor of 0.

The thus-obtained X-ray diffraction patterns of Examples 4, 8 and 9 are shown in FIG. 1. The patterns of 4 and 8 appear identical, with no additional or missing crystalline phase being present that could result in additional peaks in the diffractogram. The peaks in the patterns can be identified as typical reflections of molybdenum and nickel sulfides, often observed in materials prepared with low amount of inert oxide under sulfur high conditions. The pattern of the spent sample of Example 9 shows additional peaks, compared to the patterns for Examples 4 and 8. The additional peaks are marked by arrows in FIG. 1. These peaks correspond to the presence of additional X-ray active long-range ordered material in the sample, identified as nickel sub-sulfide $Ni_7S_6$.

The differences in the X-ray diffraction patterns reveal that catalysts having been used according to the start-up process of the present invention are the same as those having been used in a start-up process in which straight run gas oil has been applied and that by adding decylamine to the start-up feed, the formation of an additional nickel sulfide phase on the catalyst is prevented. Without wishing to be bound by theory, it is suggested that the presence of the additional nickel sulfide phase is related to the lower gas oil HDS activity seen with the samples started up in light or already hydrotreated feeds.

What is claimed is:

1. A process for starting up a hydrotreating process using a bulk metal catalyst, said process comprising the steps of:
   i) providing a hydrocarbon feed stream containing less than 100 ppmw nitrogen-containing species;
   ii) adding a nitrogen-containing compound to said hydrocarbon feed stream to provide a resultant feed stream containing more than 100 ppmw nitrogen-containing species (based on the overall weight of the feed stream); and
   iii) contacting the resultant feed stream with the bulk metal catalyst in the presence of hydrogen and a sulfur-containing species; wherein the nitrogen-containing compound is selected from the group consisting of polyfunctional amines, pyridines and their derivatives, quaternary ammonium compounds, decylamine, pyrroles, indoles, carbazoles, imidazoles, pyrrazoles, oxazoles, S,N heteroaromatics, amides, nitriles and EDTA, NTA, EGTA and DPTA; and wherein the bulk metal catalyst is a composition of the general formula (I):

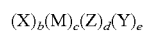

$(X)_b(M)_c(Z)_d(Y)_e$ wherein X is at least one Group VIII metal selected from the group consisting of nickel, cobalt and iron, M is a group VIb metal selected from the group consisting of chromium, molybdenum and tungsten, Y is oxygen, and Z is selected from the group of elements consisting of aluminum, silicon, magnesium, titanium, zirconium, boron and zinc, wherein Z together with the oxygen component as the element for Y forms a refractory inorganic oxide, and wherein b, c, d and e represent relative molar ratio values.

2. A process according to claim 1, wherein the hydrocarbon feed stream containing less than 100 ppmw nitrogen-containing species is a feed stream which has already been treated in a process which reduces the amount of nitrogen contained therein.

3. A process according to claim 1, wherein c is the integer 1, the ratio d:c is in the range of from 0:1 to 20:1, and the ratio e:c is in the range of from 1:1 to 50:1.

4. A process according to claim 1, wherein the nitrogen-containing compound is selected from the group consisting of polyfunctional amines, pyridines and their derivatives, and quaternary ammonium compounds.

5. A process according to claim 1, wherein the nitrogen-containing compound is decylamine.

6. A process according to claim 5, wherein the resultant feed stream is contacted with the bulk metal catalyst in the presence of hydrogen and a sulfur-containing species at a hydrogen partial pressure in the range of from 2 to 10 Mpa.

7. A process according to claim 6, wherein while the resultant feed stream is contacted with the bulk metal catalyst in the presence of hydrogen and a sulfur-containing species the temperature is increased during one or more phases and during each phase the temperature is increased at a rate in the range of from 1 to 50° C./hour.

8. A process for hydrotreating a hydrocarbon feedstock, said process comprising the steps of:
   i) providing a hydrocarbon feed stream containing less than 100 ppmw nitrogen-containing species;
   ii) adding a nitrogen-containing compound to said hydrocarbon feed stream to provide a resultant feed stream containing more than 100 ppmw nitrogen-containing species (based on the overall weight of the feed stream);
   iii) contacting the resultant feed stream with a bulk metal catalyst in the presence of hydrogen and a sulfur-containing species; wherein the nitrogen-containing compound is selected from the group consisting of polyfunctional amines, pyridines and their derivatives, quaternary ammonium compounds, decylamine, pyrroles, indoles, carbazoles, imidazoles, pyrrazoles, oxazoles, S,N heteroaromatics, amides, nitriles and N-containing complexing agents; and
   iv) subsequently contacting the resultant bulk metal catalyst with the hydrocarbon feedstock in the presence of hydrogen.

9. A process according to claim 8, wherein the bulk metal catalyst is a composition of the general formula (I):

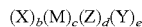

wherein X is at least one Group VIII metal selected from the group consisting of nickel, cobalt and iron, M is a group VIb metal selected from the group consisting of chromium, molybdenum and tungsten, Y is oxygen, and Z is selected from the group of elements consisting of aluminum, silicon, magnesium, titanium, zirconium, boron and zinc, wherein Z together with the oxygen component as the element for Y forms a refractory inorganic oxide and b, c, d and e represent relative molar ratio values.

10. A process according to claim 9, wherein c is the integer 1, the ratio d:c is in the range of from 0:1 to 20:1, and the ratio e:c is in the range of from 1:1 to 50:1.

11. A process according to claim 8, wherein the resultant feed stream is contacted with the bulk metal catalyst in the presence of hydrogen and a sulfur-containing species at a hydrogen partial pressure in the range of from 2 to 10 Mpa.

12. A process according to claim 8, wherein while the resultant feed stream is contacted with the bulk metal catalyst in the presence of hydrogen and a sulfur-containing species the temperature is increased during one or more phases and during each phase the temperature is increased at a rate in the range of from 1 to 50° C./hour.

13. A process according to claim 1, wherein the nitrogen-containing compound is a polyfunctional amine.

14. A process according to claim 1, wherein the nitrogen-containing compound is selected from the group consisting of pyrroles, indoles, carbazoles, imidazoles, pyrazoles, oxazoles, and S,N heteroaromatics.

15. A process according to claim 8, wherein the nitrogen-containing compound is an N-containing complexing agent selected from the group consisting of EDTA, NTA, EGTA and DPTA.

16. A process for starting up a hydrodesulfurization (HDS) process which utilizes a bulk metal catalyst comprising nickel and molybdenum, said process comprising the steps of:
   i) providing a hydrocarbon feed stream containing less than 100 ppmw organic nitrogen-containing species;
   ii) adding a C4 to C20 amine to said hydrocarbon feed stream to provide a resultant feed stream containing more than 100 ppmw organic nitrogen-containing species (based on the overall weight of the feed stream); and
   iii) contacting the resultant C4 to C20 amine-containing hydrocarbon feed stream with said bulk metal catalyst in the presence of hydrogen and a sulfur-containing species, whereby said amine prevents the formation of an additional nickel sub-sulfide $Ni_7S_6$ phase thereby improving the HDS activity of said bulk metal catalyst.

* * * * *